United States Patent
Woods et al.

(10) Patent No.: US 9,528,764 B2
(45) Date of Patent: Dec. 27, 2016

(54) MODULAR HEAT TREATMENT SYSTEM

(71) Applicant: General Electric Company, Schenectady, NY (US)

(72) Inventors: Steven Charles Woods, Easley, SC (US); Ronald Lee Souther, Campobello, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/972,786

(22) Filed: Dec. 17, 2015

(65) Prior Publication Data
US 2016/0102914 A1    Apr. 14, 2016

Related U.S. Application Data

(62) Division of application No. 13/561,778, filed on Jul. 30, 2012, now Pat. No. 9,242,313.

(51) Int. Cl.
| | |
|---|---|
| *F27B 9/04* | (2006.01) |
| *F27D 7/06* | (2006.01) |
| *F27D 7/02* | (2006.01) |
| *B01J 3/04* | (2006.01) |
| *B23K 13/01* | (2006.01) |
| *B23K 9/32* | (2006.01) |
| *B23K 28/00* | (2006.01) |

(52) U.S. Cl.
CPC ............ *F27B 9/045* (2013.01); *B23K 28/003* (2013.01); *F27D 7/02* (2013.01); *F27D 7/06* (2013.01); *B23K 2201/001* (2013.01); *B23K 2203/08* (2013.01); *B23K 2203/26* (2015.10); *F27D 2007/063* (2013.01)

(58) Field of Classification Search
None
See application file for complete search history.

(56) References Cited

U.S. PATENT DOCUMENTS

| | | | | |
|---|---|---|---|---|
| 3,575,398 A | * | 4/1971 | Lincoln ............... | F27D 99/0075 432/34 |
| 3,606,281 A | * | 9/1971 | Price et al. .......... | F27B 9/2407 432/124 |
| 3,659,831 A | * | 5/1972 | Reber ..................... | C21D 1/63 266/132 |
| 4,102,751 A | * | 7/1978 | Stalherm ................ | C10B 21/14 201/26 |

(Continued)

OTHER PUBLICATIONS

Gorman, Office Action Communication for U.S. Appl. No. 13/561,778 dated Jun. 5, 2015, 22 pages.

(Continued)

*Primary Examiner* — Gregory Huson
*Assistant Examiner* — Eric Gorman
(74) *Attorney, Agent, or Firm* — Ernest G. Cusick; Hoffman Warnick LLC

(57) ABSTRACT

A plurality of substantially identical, thermally and/or atmospherically isolated modules can be employed to effect a treatment process. Each module can include a thermal system and/or atmospheric control system to effect a step of a treatment process, such as a heat treatment process for metal articles, particularly heat treatment and/or welding of parts made from so-called "super allows." The module control systems can communicate and/or cooperate to carry out a process.

15 Claims, 3 Drawing Sheets

(56) References Cited

U.S. PATENT DOCUMENTS

| | | | |
|---|---|---|---|
| 4,111,753 A | 9/1978 | Folsom et al. | |
| 4,128,394 A * | 12/1978 | Naito | C04B 35/532 |
| | | | 432/137 |
| 4,176,268 A * | 11/1979 | Gerling | H05B 6/782 |
| | | | 219/699 |
| 4,200,805 A | 4/1980 | LeFrancois | |
| 4,653,732 A | 3/1987 | Wunning et al. | |
| 4,965,435 A * | 10/1990 | Smith | A21B 1/245 |
| | | | 126/21 A |
| 5,168,916 A * | 12/1992 | Doriath | B22D 27/15 |
| | | | 164/122.1 |
| 5,505,599 A | 4/1996 | Kemerer et al. | |
| 5,505,654 A | 4/1996 | Wood et al. | |
| 5,876,118 A | 3/1999 | Vogel | |
| 6,124,568 A | 9/2000 | Broderick et al. | |
| 6,297,474 B1 | 10/2001 | Kelly et al. | |
| 6,332,909 B1 * | 12/2001 | Teshima | B09B 3/00 |
| | | | 432/128 |
| 6,428,122 B1 | 8/2002 | Henry et al. | |
| 6,583,387 B2 | 6/2003 | Kelly et al. | |
| 7,150,627 B2 | 12/2006 | Gaur et al. | |
| 7,255,829 B1 | 8/2007 | Peter et al. | |
| 7,381,383 B1 * | 6/2008 | Yokoyama | B01D 53/002 |
| | | | 266/144 |
| 8,580,052 B2 | 11/2013 | Meyer | |
| 9,027,504 B2 * | 5/2015 | Miyamoto | B05C 13/02 |
| | | | 118/58 |
| 2003/0117596 A1 | 6/2003 | Nishi | |
| 2005/0183823 A1* | 8/2005 | Yonekawa | G03F 7/70525 |
| | | | 156/345.31 |
| 2006/0082034 A1* | 4/2006 | Rogers | B23K 1/008 |
| | | | 266/87 |
| 2010/0107567 A1 | 5/2010 | Khan et al. | |
| 2010/0226629 A1 | 9/2010 | Basol et al. | |
| 2010/0300867 A1 | 12/2010 | Kim et al. | |
| 2012/0104667 A1* | 5/2012 | Tseng | C21D 9/0056 |
| | | | 266/81 |
| 2012/0153010 A1* | 6/2012 | Abe | B23K 1/0016 |
| | | | 228/219 |
| 2012/0238075 A1* | 9/2012 | Miyamoto | C23C 2/003 |
| | | | 438/478 |
| 2012/0304921 A1* | 12/2012 | Miyamoto | H01L 21/67109 |
| | | | 118/58 |
| 2012/0308715 A1* | 12/2012 | Miyamoto | H01L 21/6715 |
| | | | 427/74 |
| 2012/0309179 A1* | 12/2012 | Miyamoto | H01L 31/0322 |
| | | | 438/502 |
| 2013/0095006 A1 | 4/2013 | Hsu | |
| 2013/0269602 A1* | 10/2013 | Miyamoto | H01L 31/186 |
| | | | 118/66 |
| 2013/0269604 A1* | 10/2013 | Miyamoto | B05B 1/00 |
| | | | 118/300 |
| 2013/0273252 A1* | 10/2013 | Miyamoto | B05D 3/12 |
| | | | 427/348 |
| 2013/0309408 A1* | 11/2013 | Miyamoto | H01L 31/0322 |
| | | | 427/421.1 |
| 2014/0008420 A1* | 1/2014 | Miyamoto | H01L 31/0322 |
| | | | 228/225 |
| 2014/0030667 A1* | 1/2014 | Woods | B23K 28/003 |
| | | | 432/120 |
| 2014/0053515 A1 | 2/2014 | Koolhaas et al. | |
| 2014/0263273 A1* | 9/2014 | Sahoda | H01L 21/67109 |
| | | | 219/444.1 |
| 2014/0311405 A1* | 10/2014 | Mauck | B05C 15/00 |
| | | | 118/323 |
| 2014/0363903 A1* | 12/2014 | Miyamoto | H01L 21/67253 |
| | | | 438/5 |
| 2014/0370451 A1* | 12/2014 | Sahoda | H01L 21/67109 |
| | | | 432/32 |
| 2015/0090768 A1 | 4/2015 | Kuroda et al. | |

OTHER PUBLICATIONS

Gorman, Notice of Allowance and Fee(s) Due for U.S. Appl. No. 13/561,778 dated Sep. 18, 2015, 10 pages.

* cited by examiner

MODULAR HEAT TREATMENT SYSTEM

CROSS-REFERENCE TO RELATED APPLICATIONS

This application is a divisional of currently pending U.S. patent application Ser. No. 13/561,778 filed on Jul. 30, 2012. The application identified above is incorporated herein by reference in its entirety for all that it contains in order to provide continuity of disclosure.

BACKGROUND OF THE INVENTION

The disclosure relates generally to welding furnaces, and more particularly to welding furnaces allowing special handling of work pieces made from superalloys.

Components of apparatus that are exposed to high temperatures and/or high stress environments, such as rotor blades in a gas turbine engine, for example, are generally made of high performance alloys. In particular, so-called "superalloys" have come into wide use for such applications. These superalloys typically are based on nickel and/or cobalt and are generally used to form articles by casting. However, circumstances arise in which components must be welded. For example, because superalloys are expensive, it has become desirable to repair or restore parts made from superalloys rather than outright replace such parts. While articles of relatively simple geometries may be welded in currently-available welding apparatus with success, articles of more complex geometries may not enjoy as successful or high quality welding in such apparatus, particularly where such articles are processed at elevated temperatures. In addition, superalloy parts tend to oxidize in ambient atmosphere at such elevated temperatures, which contributes to failure or poor quality of welds.

Some superalloy components require thermal stress relief prior to welding so that residual stresses in the components may be removed or relieved. For example, if a component has been removed from service in a gas turbine, such as for reconditioning or repair, stresses may remain in the component as a result of its service. Welding and/or cooling after welding may also induce stresses in components requiring additional stress relief, such as with heat treatment. As is known, heat treatment follows specific processes including ramping rates, soak temperatures, hold times, and cooling rates that improve the likelihood of achieving desired qualities in the final article or component. Deviation from these processes may result in flaws or undesired characteristics of the final article or component. As a result, it is recognized that a high degree of control over the environment in which an article is processed is desirable.

Heat treatment of articles in the past generally employed large-scale blast furnaces and the like in which large numbers of articles were treated at the same time. However, such large-scale solutions typically have long heat treatment times due to several factors. For example, a large blast furnace as a large mass to heat, and the typically large number of parts being heat treated in a batch adds additional mass. Additionally, long queuing times may occur while batches are assembled as individual components are repaired. Therefore, batch furnace pre-weld and post-weld stress relief heat treatments may cause delay in a welding line. Further, such large—scale blast furnaces typically have no control over the atmospheric composition to which the parts are exposed, thus exposing superalloy parts to potentially oxidizing ambient atmosphere.

BRIEF DESCRIPTION OF THE INVENTION

Embodiments of the invention disclosed herein may take the form of a welding apparatus having a first enclosure arranged to receive an article to be processed and a heating system arranged to heat the article to be processed in the first enclosure. A first enclosure door into the first enclosure may be arranged to selectively allow access to the first enclosure through a first side of the first enclosure, and an atmosphere control system may be arranged to provide a substantially inert atmosphere in at least the first enclosure. The atmosphere control system may include a sealing system arranged to retain a desired atmosphere in each enclosure under control of the atmosphere control system. A viewport assembly may be arranged on a second side of the first enclosure and may include a window made of a high-temperature-resistant, substantially transparent material arranged to allow viewing of the first enclosure from outside the first enclosure.

Another embodiment may include a viewport assembly for a welding apparatus having a neck extending from an attachment end to a viewing end. The attachment end may include an attachment arrangement arranged to attach the viewport assembly to a welding apparatus, and the neck may form a passage from the attachment end to the viewing end. The neck may have an end wall of the neck at the viewing end and a window made from a high-temperature-resistant, substantially transparent material may be mounted in the end wall.

Another embodiment may take the form of a modular heat treatment system comprising a retort chamber arranged to receive an article to be welded and a retort chamber heating system arranged to heat the retort chamber to a first predefined temperature. A retort portion of an article transport arrangement may extend into the retort chamber from a first side of the retort chamber. A retort door at the first side of the retort chamber may selectively provide access to the interior of the retort chamber through the first side. A first thermal chamber may be attached to the first side of the retort chamber and may include a first portion of the article transport arrangement arranged to be connected to the retort portion of the article transport arrangement to allow transport of an article from the first thermal chamber into the retort chamber. The first thermal chamber may also include a first thermal system arranged to place an interior of the first thermal chamber at a second predefined temperature, the first thermal system being at least one of a heating system and a cooling system. A first chamber door may be provided in a side of the first thermal chamber other than a side at which the first thermal chamber is attached to the retort chamber to selectively allow access to an interior of the first thermal chamber.

Other aspects of the invention provide methods, systems, program products, and methods of using and generating each, which include and/or implement some or all of the actions described herein. The illustrative aspects of the invention are designed to solve one or more of the problems herein described and/or one or more other problems not discussed.

BRIEF DESCRIPTION OF THE DRAWING

These and other features of the disclosure will be more readily understood from the following detailed description of the various aspects of the invention taken in conjunction with the accompanying drawings that depict various aspects of the invention.

It is noted that the drawings may not be to scale. The drawings are intended to depict only typical aspects of the invention, and therefore should not be considered as limiting the scope of the invention. In the drawings, like numbering represents like elements between the drawings.

The detailed description explains embodiments of the invention, together with advantages and features, by way of example with reference to the drawings.

DETAILED DESCRIPTION OF THE INVENTION

Figure 1:
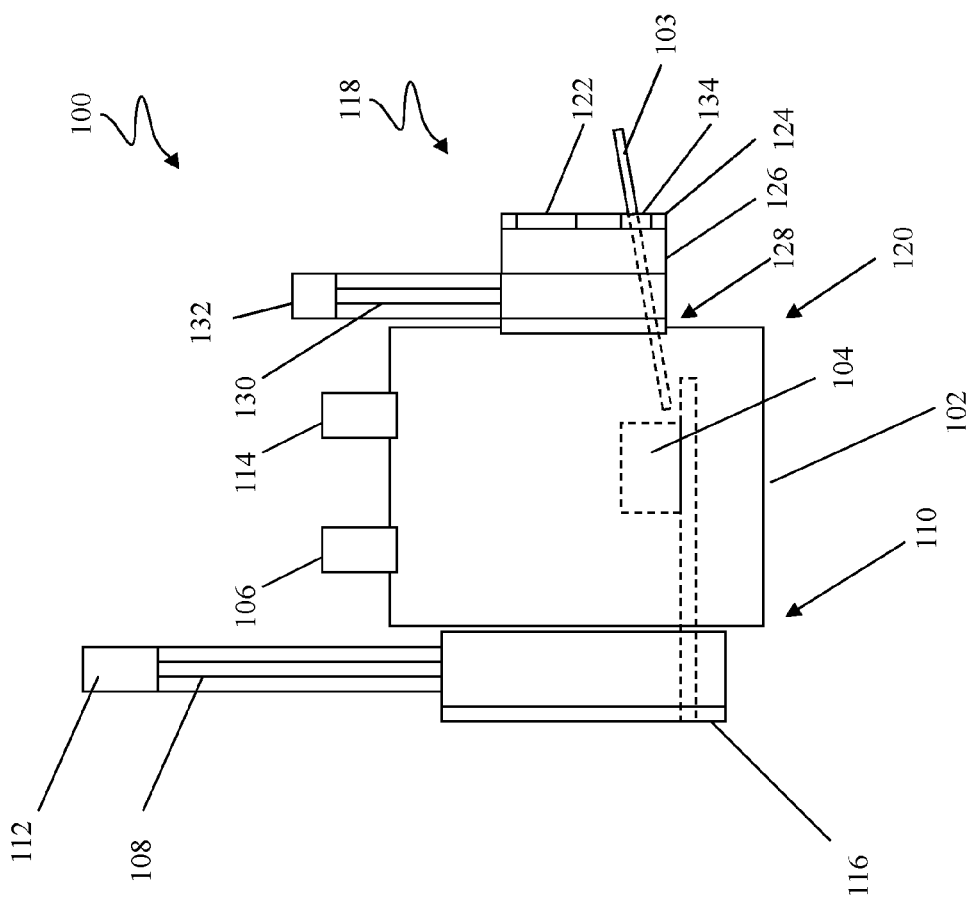
FIG. 1 shows a schematic diagram of a welding apparatus according to embodiments of the invention disclosed herein viewed from a side.
Figure 2:
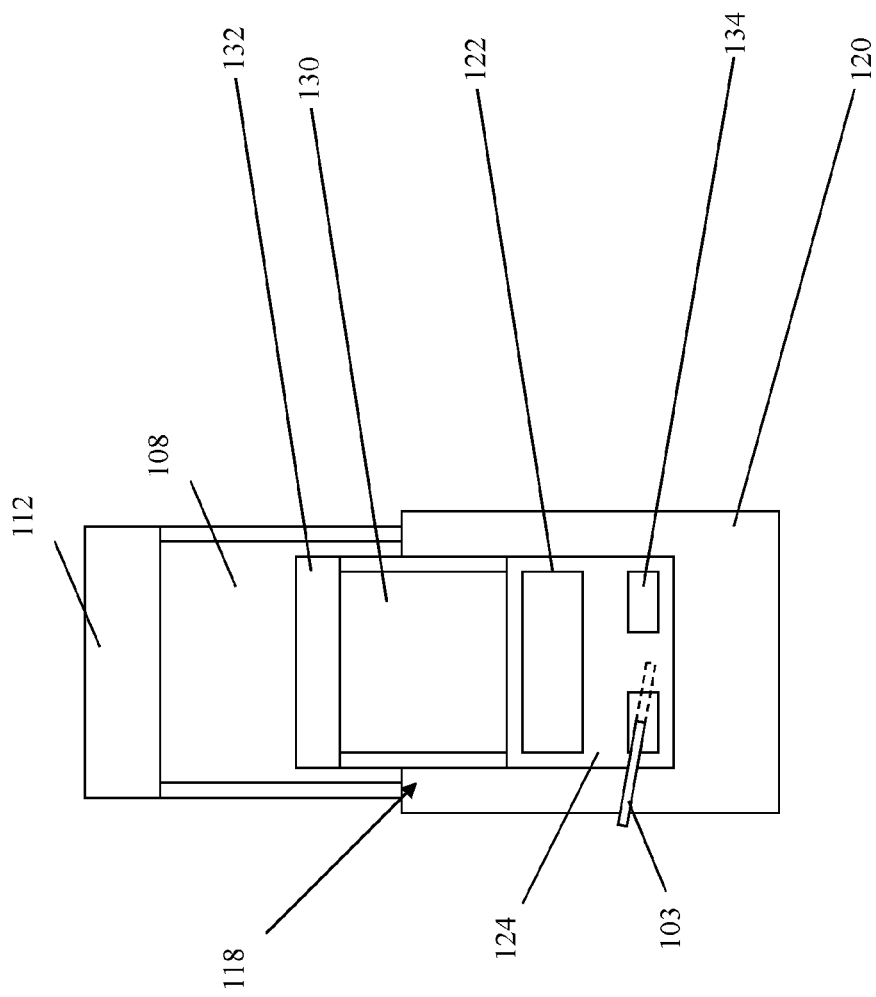
FIG. 2 shows a schematic diagram of a viewport of a welding apparatus according to embodiments of the invention disclosed herein viewed from an end.

As indicated above, aspects of the invention provide a welding apparatus and method. With reference to FIGS. 1 and 2, embodiments of the invention disclosed herein may include a welding apparatus 100 including a first enclosure 102 arranged to receive an article to be processed 104. A heating system 106 may be arranged in first enclosure 102 to heat the article to be processed 104. For example, heating system 106 may include a plurality of radiant heating elements, though other heat sources may be employed in embodiments. A first enclosure door 108 may selectively allow access to first enclosure 102 through a first side 110 of first enclosure 102. An actuator 112 may be included to open and close first enclosure door 108 as may be desired. Any suitable actuator and door may be used, though embodiments may employ a guillotine-style door of a material that may withstand extreme heat, such as a ceramic material. A suitable material should be selected to withstand temperatures required for processing the article 104, such as at least 1800 degrees Fahrenheit where an article to be processed is made from a superalloy.

In embodiments, an atmosphere control system 114 may be configured to provide a substantially inert atmosphere in first enclosure 102. For example, atmospheric control system 114 may supply argon, hydrogen, nitrogen, or another gas that will have little or no chemical interaction with the article to be processed 104. Atmospheric control system 114 may additionally induce a positive pressure in first enclosure 102 so as to prevent entry of ambient air into first enclosure 102 from the exterior of first enclosure 102. A sealing system 116 may be arranged to retain atmosphere in first enclosure 102 and/or to prevent entry of external atmosphere into first enclosure 102. Sealing system 116 may include, for example, gaskets, toothed seals, labyrinth seals, or other seals as may be appropriate.

A viewport assembly 118 on a second side 120 of first enclosure 102 may allow a user to view the interior of first enclosure 102. A window 122 made of a high-temperature-resistant, substantially transparent material may be mounted in viewport assembly 118. For example, window 122 may be made from sapphire, which may remain transparent and withstand temperatures of 1800 degrees Fahrenheit without significant damage, though other materials might be employed as suitable and/or desired. Window 122 may be mounted in an end wall 124 of a neck 126 of viewport assembly 118 attached to second side 120 of first enclosure 102 via an attachment point 128. A viewport door 130 may be provided at the attachment arrangement end of neck 126 and may selectively be closed to reduce or eliminate heat from entering neck 126 and/or to strike window 122, such as with a viewport door actuator 132. In addition, at least one access port 134 may be included in viewport assembly 118, such as in end wall 124. Access port 134 may be used, for example, to allow a user selective access to first enclosure 102, such as to use a welding device 103 to weld the article to be processed 104. Attachment point 128, access port 134, window 122, and/or other portions of viewport assembly 118 may include seals compatible with sealing system 116 of first enclosure 102 so as to preserve atmospheric integrity within first enclosure 102 and in viewport assembly 118 as controlled by atmosphere control system 114.

Figure 3:
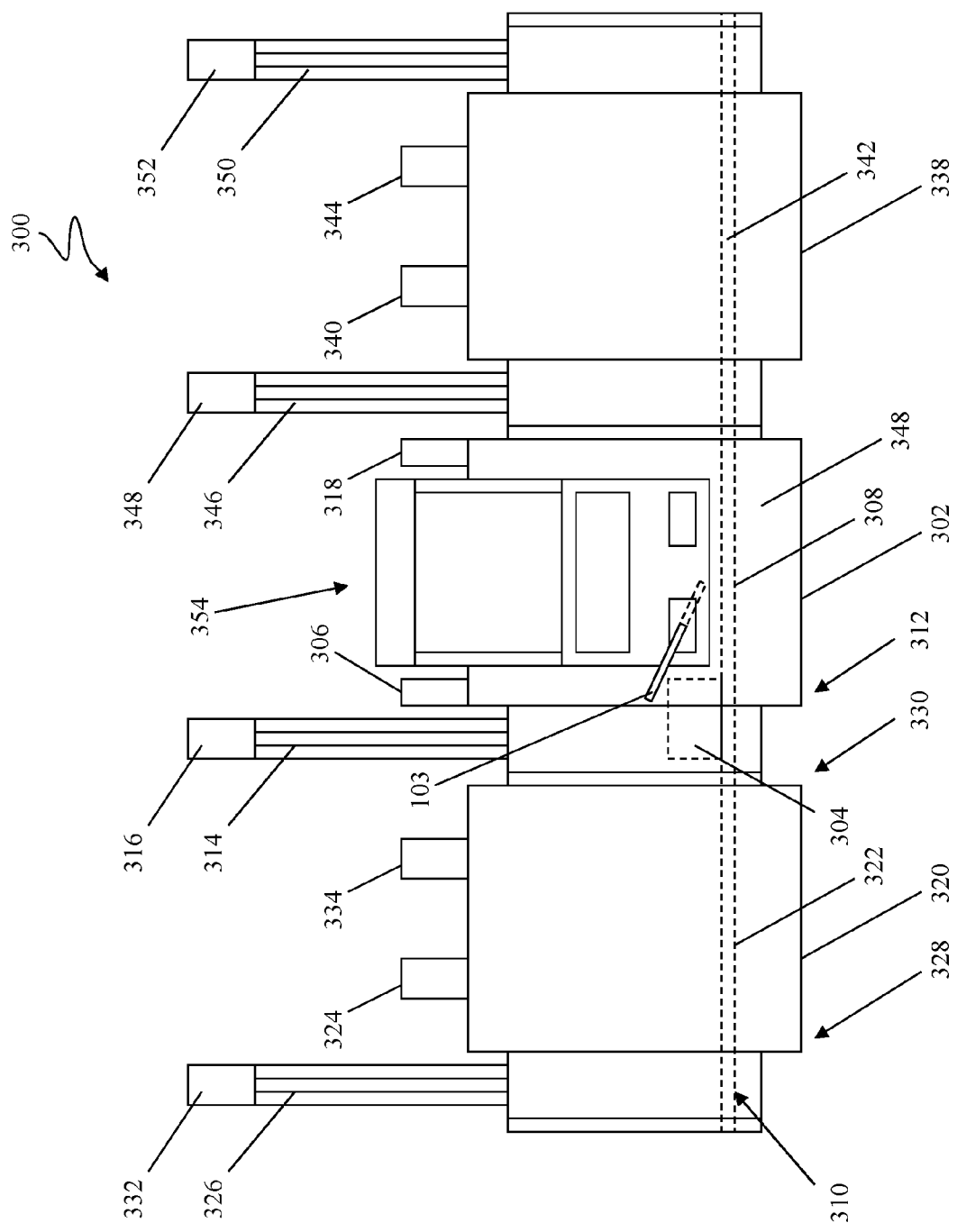
FIG. 3 shows a schematic diagram of a welding apparatus according to embodiments of the invention disclosed herein.

In another embodiment of the invention disclosed herein, as seen in FIG. 3, a modular heat treatment system 300 may include a retort chamber 302 arranged to receive an article to be welded 304. A retort chamber heating system 306 may be arranged to heat retort chamber 302 to a first predefined temperature, and a retort portion 308 of an article transport arrangement 310 may extend into retort chamber 302 from a first side 312 of retort chamber 302. A retort door 314 at first side 312 of retort chamber 302 may selectively provide access to the interior of retort chamber 302 through first side 312, such as by being opened and closed by an actuator 316. An atmospheric control system 318 may maintain an atmosphere within retort chamber 302, such as by maintaining an atmosphere of a gas that is substantially inert with respect to the article to be processed. For example, argon, hydrogen, nitrogen, or another gas that is substantially non-reactive with superalloys used in turbine blades may be used.

A first thermal chamber 320 attached to first side 312 of retort chamber 302 may include a first portion 322 of article transport arrangement 310 and may be arranged to be connected to retort portion 308 of article transport arrangement 310 to allow transport of an article from first thermal chamber 320 into retort chamber 302 and vice versa. First thermal chamber 320 may include a first thermal system 324 arranged to place an interior of first thermal chamber 320 at a second predefined temperature. In embodiments, first thermal system 324 may be a heating system, while in other embodiments, first thermal system 324 may be a cooling system, depending on the particular processes sought to be performed with modular heat treatment system 300. First thermal chamber 320 may further include a first chamber door 326 in a side 328 of first thermal chamber 320 other than a side 330 at which first thermal chamber 320 is attached to retort chamber 302. Like retort door 314, first chamber door 326 may selectively allow access to an interior of first thermal chamber 302, such as by being opened and closed with actuator 332. Both retort door 314 and first chamber door 326 may be made from heat-resistant materials selected to withstand and/or insulate against temperatures retort 302 and/or first thermal chamber 320 may experience. First thermal chamber 320 may additionally include an atmospheric control system 334 arranged to maintain a desired atmosphere within first thermal chamber 320 and/or retort chamber 302, like atmospheric control system 318 of retort chamber 320. Atmospheric control systems 318, 334 may coordinate in embodiments, or may operate independently, or one may become a portion of the other as suitable and/or desired.

In embodiments, a second thermal chamber 338 may be attached to retort chamber 302 or first thermal chamber 320. Second thermal chamber 338 may be substantially structurally identical to first thermal chamber 320 and/or retort chamber 302, and may include a second thermal system 340, a respective portion 342 of article transport arrangement 310, and/or a respective atmospheric control system 344 that may coordinate with and/or become part of retort atmospheric control system 318 and/or first thermal chamber atmospheric control system 334 to maintain a substantially inert atmosphere in retort 302, first thermal chamber 320, and/or second thermal chamber 338. Second thermal chamber 338 may also include a second chamber door 346 operated by an actuator 348 to provide access between second thermal chamber 338 and retort chamber 302. Where second thermal chamber 338 is the last thermal chamber, it may also include an end door 350 operated by a respective actuator 352.

By providing such substantially structurally identical thermal chambers, a heat treatment system may be assembled that may perform any heat treatment cycle desired. For example, in the example shown, first thermal chamber 320 may be a pre-heat chamber in which an article may be heated to a first temperature for a first period in preparation for entry into retort chamber 302, and second thermal chamber 338 may be a cooling chamber. Additional chambers could be connected to either end of the assembly to accommodate whatever additional steps might be performed, each chamber including a suitable heating or cooling system as its thermal system.

A viewport assembly 354 may be attached to a second side 348 of retort chamber 302 and arranged to allow viewing of an interior of retort chamber 302 from an exterior of retort chamber 302. Viewport assembly 354 may, for example, be provided as described with respect to FIGS. 1 and 2 above. Additional such viewport assemblies may be attached to any of first or second thermal chamber 320, 338, and/or any additional thermal chambers of modular heat treatment system 300 as may be provided.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A system comprising:
   a first enclosure arranged to receive an article to be processed;
   a heating system arranged to heat the article to be processed in the first enclosure;
   a first enclosure door into the first enclosure arranged to selectively allow access to the first enclosure through a first side of the first enclosure;
   an article transport system extending into the first enclosure from the first enclosure door to selectively transport the article to be processed from the first enclosure door into the first enclosure;
   a second enclosure substantially identical to the first enclosure and connected thereto, the second enclosure including:
      a portion of the heating system arranged to heat the article to be processed in the first enclosure;
      a second enclosure door in a side of the second enclosure other than a side connected to the first enclosure;
      a portion of the article transport arrangement extending from the second enclosure door to the first enclosure to selectively transport the article to be processed from the second enclosure door into the second enclosure and to the first enclosure; and
   an atmosphere control system arranged to provide a substantially inert atmosphere in at least the first enclosure, the atmosphere control system including a sealing system arranged to retain a desired atmosphere in each enclosure under control of the atmosphere control system,
   and wherein the first enclosure is a retort chamber and includes a viewport assembly attached to a second side of the first enclosure with a neck extending from the second side of the retort chamber and a viewport door attached to the neck at the second side of the first enclosure arranged to selectively close the viewport assembly from the retort chamber to thereby reduce passage of heat into the neck, the viewport assembly further including a window made of a high-temperature-resistant, substantially transparent material and arranged to allow viewing of the first enclosure from outside the first enclosure.

2. The system of claim 1, further comprising at least a third enclosure attached to the respective first side of a preceding enclosure, each of the at least a third enclosure including a portion of the heating system.

3. The system of claim 2, wherein the atmosphere control system controls a respective gas mixture of more than one of the enclosures.

4. The system of claim 3, wherein the atmosphere control system selectively maintains a substantially inert atmosphere in the retort chamber.

5. A system comprising:
   a retort chamber arranged to receive an article to be welded;
   a retort chamber heating system arranged to heat the retort chamber to a first predefined temperature;
   a retort portion of an article transport arrangement extending into the retort chamber from a first side of the retort chamber;
   a retort door at the first side of the retort chamber, the retort door selectively providing access to an interior of the retort chamber through the first side; and
   a first thermal chamber attached to the first side of the retort chamber and including:
      a first portion of the article transport arrangement arranged to be connected to the retort portion of the article transport arrangement to allow transport of an article from the first thermal chamber into the retort chamber;
      a first thermal system arranged to place an interior of the first thermal chamber at a second predefined temperature, the first thermal system being at least one of a heating system and a cooling system;
      a first chamber door in a side of the first thermal chamber other than a side at which the first thermal chamber is attached to the retort chamber, the first chamber door selectively allowing access to the interior of the first thermal chamber; and
   a viewport assembly attached to a second side of the retort chamber with a neck extending from the second side of the retort chamber and a viewport door attached to the neck at the second side of the retort chamber arranged to selectively close the viewport assembly from the retort chamber to thereby reduce passage of heat into the neck, the viewport assembly further including a window made of a high-temperature-resistant, substantially transparent material and arranged to allow viewing of the retort chamber from outside the retort chamber.

6. The system of claim 5, further comprising at least a second thermal chamber substantially identical to the first thermal chamber and arranged to be attached to one of another thermal chamber or the retort chamber, each respective portion of the article transport arrangement including an end in proximity to an end of at least one other portion of the article transport arrangement to continue the article transport arrangement, and each respective thermal system including at least one of a heating device and a cooling device to thereby place its respective interior to a respective predefined temperature according to a treatment process.

7. The system of claim 6, wherein the thermal systems are in communication and cooperate to effect the treatment process.

8. The system of claim 6, wherein the retort chamber includes an atmospheric control system arranged to maintain a substantially inert atmosphere in the retort chamber, and each thermal chamber includes an atmospheric control system arranged to coordinate with the retort atmospheric control system to maintain the substantially inert atmosphere in a desired portion of the system.

9. A system comprising a plurality of chambers selectively thermally and atmospherically isolated from each other, each chamber of the plurality of chambers attached to at least one other of the plurality of chambers and including:
  a thermal system;
  a portion of an article transport arrangement extending into the chamber from a first side of the chamber; and
  a door in the first side of the chamber; and
  the plurality of chambers including:
  a retort chamber arranged to receive an article to be treated via the respective retort chamber portion of the article transport arrangement, the respective retort chamber thermal system including a heating device arranged to heat the retort chamber according to a treatment process, wherein the retort chamber includes a viewport assembly attached to a second side of the retort chamber with a neck extending from the second side of the retort chamber and a viewport door attached to the neck at the second side of the retort chamber arranged to selectively close the viewport assembly from the retort chamber to thereby reduce passage of heat into the neck, the viewport assembly further including a window made of a high-temperature-resistant, substantially transparent material and arranged to allow viewing of the retort chamber from outside the retort chamber; and
  a first chamber attached to the first side of the retort chamber at a second side of the first chamber, an end of the respective first chamber portion of the article transport arrangement being in proximity to an end of the retort chamber portion of the article transport arrangement to thereby selectively deliver the article to be treated to the retort chamber portion of the article transport arrangement, the respective first chamber thermal system including at least one of a heating device and a cooling device to place an interior of the first thermal chamber at a second predefined temperature for a second period according to the treatment process.

10. The system of claim 9, further comprising at least a second chamber including a second side attached to the first side of a preceding chamber, and a respective thermal system enabling a respective step of the treatment process.

11. The system of claim 9, wherein at least one of the plurality of chambers includes an atmospheric control system to control a gas mixture in a respective interior of the chamber according to the treatment process.

12. The system of claim 11, wherein each of the plurality of chambers includes an atmospheric control system to control a respective gas mixture.

13. The system of claim 11, wherein more than one of the plurality of chambers includes an atmospheric control system, and each atmospheric control system is in communication with at least one other atmospheric control system.

14. The system of claim 9, wherein the thermal system of each of the plurality of chambers is in communication with the thermal system of at least one other of the plurality of chambers.

15. The system of claim 14, wherein all of the thermal systems communicate and cooperate to effect the treatment process.

* * * * *